H. BENTLEY.
ROLLER BEARING FOR TROUGH CONVEYERS, &c.
APPLICATION FILED JULY 11, 1908.
941,972.
Patented Nov. 30, 1909.
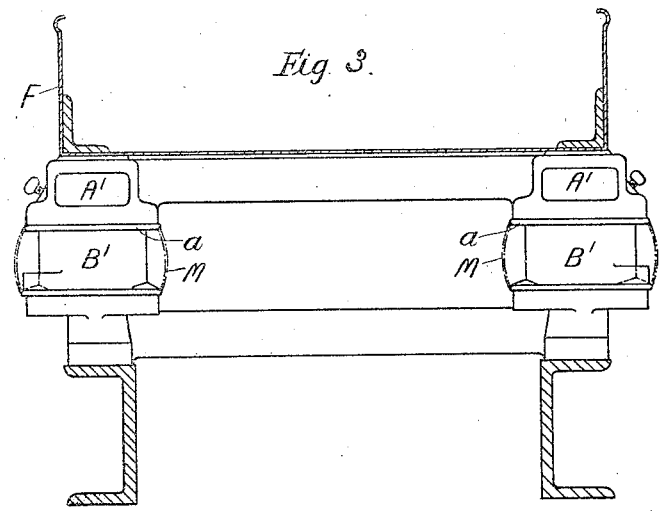
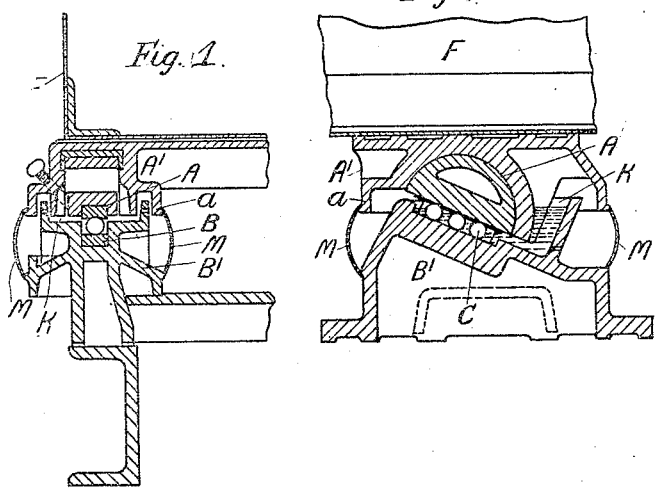
Witnesses
C. H. Sweeney
J. D. Klinge
Inventor
Harry Bentley,
By Calver & Calver,
Attorneys

UNITED STATES PATENT OFFICE.

HARRY BENTLEY, OF WHITEHAVEN, ENGLAND.

ROLLER-BEARING FOR TROUGH-CONVEYERS, &c.

941,972.    Specification of Letters Patent.    Patented Nov. 30, 1909.

Application filed July 11, 1908. Serial No. 443,133.

*To all whom it may concern:*

Be it known that I, HARRY BENTLEY, a subject of the King of the United Kingdom of Great Britain and Ireland, and residing at Whitehaven, Cumberland, England, have invented a new and useful Improvement in Roller-Bearings for Trough-Conveyers, &c., of which the following is a specification.

This invention relates to reciprocating trough conveyers, combined screens and conveyers, jigging screens, picking belts, and the like, and has for its object to provide suitable self-adjusting anti-friction bearings for devices of the kind referred to, the reciprocating troughs or the like being moved up and down as they are reciprocated back and forth by virtue of stationary bearings between which and self-adjusting bearings movable with the trough or the like anti-friction balls or rollers are interposed.

In the accompanying drawing Figures 1 and 2 are vertical sectional views, at right angles to each other, illustrating one of the improved bearings and showing a portion of a reciprocating trough, and Fig. 3 is a cross section of the trough showing the bearings in elevation.

Referring to the drawing, F denotes a trough or other reciprocating part, which may be of any suitable construction and to which are fixed brackets or supports A′ provided with overhanging grooved flanges *a* projecting beyond and surrounding receptacles K, formed on stationary brackets or supports B′, so as to prevent dust or other foreign matter from entering the ball races and oil-containing receptacles between the said parts A′ and B′. The stationary brackets or supports B′ are provided with inclined bearings or ball races, and oil containing receptacles K, and the movable brackets A′ are provided with self-adjusting, semi-circular fittings or bearings A the rounded portions of which fit in corresponding sockets in the brackets A. Between the fittings or bearings A′ and the inclined portions or raceways on the supports B′ are interposed anti-friction balls or rollers contained in the receptacles K, which latter are preferably partly filled with oil for lubricating the bearings. Aside from the protection afforded by the grooved flanges *a* which receive flanges on the brackets or supports B′, to form loose dust-locks, the bearings are preferably further protected by flexible covers M of leather or other suitable material attached to or connected with the parts A′ and B′.

The troughs or other reciprocating parts F may be operated, so as to be moved back and forth, in any suitable manner, and as they are reciprocated back and forth they will be moved up and down by virtue of the inclined raceways hereinbefore described, and in such movements the semi-circular bearings or fittings A will be self-adjusting to accommodate the different positions of the parts, as will be understood.

Having thus described my invention I claim and desire to secure by Letters Patent of the United States:

In a machine of the character referred to, the combination with a reciprocating part provided with inclined bearings movable with said part, of a support provided with inclined raceways, anti-friction rolling devices interposed between said inclined bearings and raceways, the bearing members on said reciprocating part having semi-circular self-adjusting fittings socketed in said reciprocating part and engaging said rolling devices.

In testimony whereof I have signed my name to this specification in the presence of two subscribing witnesses.

HARRY BENTLEY.

Witnesses:
WALLACE CRANSTON FAIRWEATHER,
JOHN MCCLEARY.